United States Patent [19]

Gunn

[11] Patent Number: 5,055,277

[45] Date of Patent: Oct. 8, 1991

[54] FUMIGATING APPARATUS FOR SHIPPING CONTAINERS

[76] Inventor: Lawrence H. Gunn, 2283 Waltonia Dr., Montrose, Calif. 91020

[21] Appl. No.: 207,459

[22] Filed: Jun. 16, 1988

[51] Int. Cl.⁵ ............................................. A61L 2/20
[52] U.S. Cl. .................................. 422/294; 239/57; 239/60; 383/7; 383/24; 383/37; 383/38; 383/71; 383/102; 422/28; 422/32; 422/300; 422/302; 422/305
[58] Field of Search .................. 422/28, 32, 292, 294, 422/300, 302, 305; 383/7, 24, 37, 38, 71, 102, 103; 239/34, 57, 60

[56] References Cited

U.S. PATENT DOCUMENTS

| | | | |
|---|---|---|---|
| 2,040,559 | 5/1936 | Luttrell | 383/03 |
| 2,565,394 | 8/1951 | Ryan | 383/102 |
| 2,633,452 | 3/1953 | Hogaboom et al. | 383/102 |
| 3,377,121 | 4/1968 | Billesbach et al. | 383/24 |
| 3,387,641 | 6/1968 | Osborne | 383/24 |
| 3,422,985 | 1/1969 | Rinehart | 383/102 |
| 4,059,048 | 11/1977 | Dickson | 422/32 |
| 4,388,739 | 6/1983 | Martimon et al. | 383/102 |
| 4,521,045 | 6/1985 | Hart | 383/24 |
| 4,641,573 | 2/1987 | Gunn | 422/292 |
| 4,756,117 | 7/1988 | Friemel | 422/32 |

Primary Examiner—Robert J. Warden
Assistant Examiner—Timothy M. McMahon

[57] ABSTRACT

Large shipping containers used to hold bulk-packaged commodities, such as hay, can be efficiently fumigated of pests and vermin by means of an apparatus which includes a long, flexible chain or string of gas-permeable, solid fumigant holders, and a long, rigid pole or thrusting member. The holders are joined at predetermined intervals within the string by means of pre-cut lengths of rope or cord and the pole is attached to a distal-most one of the holders and used to thrust the string of holders into the container through its open end and into the headspace above the commodity to be fumigated. The pole is then detached from the string and removed from the container to leave the string in place. The container, is closed, and fumigation is accomplished by permitting the solid fumigant to react with ambient moisture within the container for the static time necessary to produce its toxic gas. After fumigation is complete, the string of holders may be emptied of residue and washed for reuse.

25 Claims, 2 Drawing Sheets

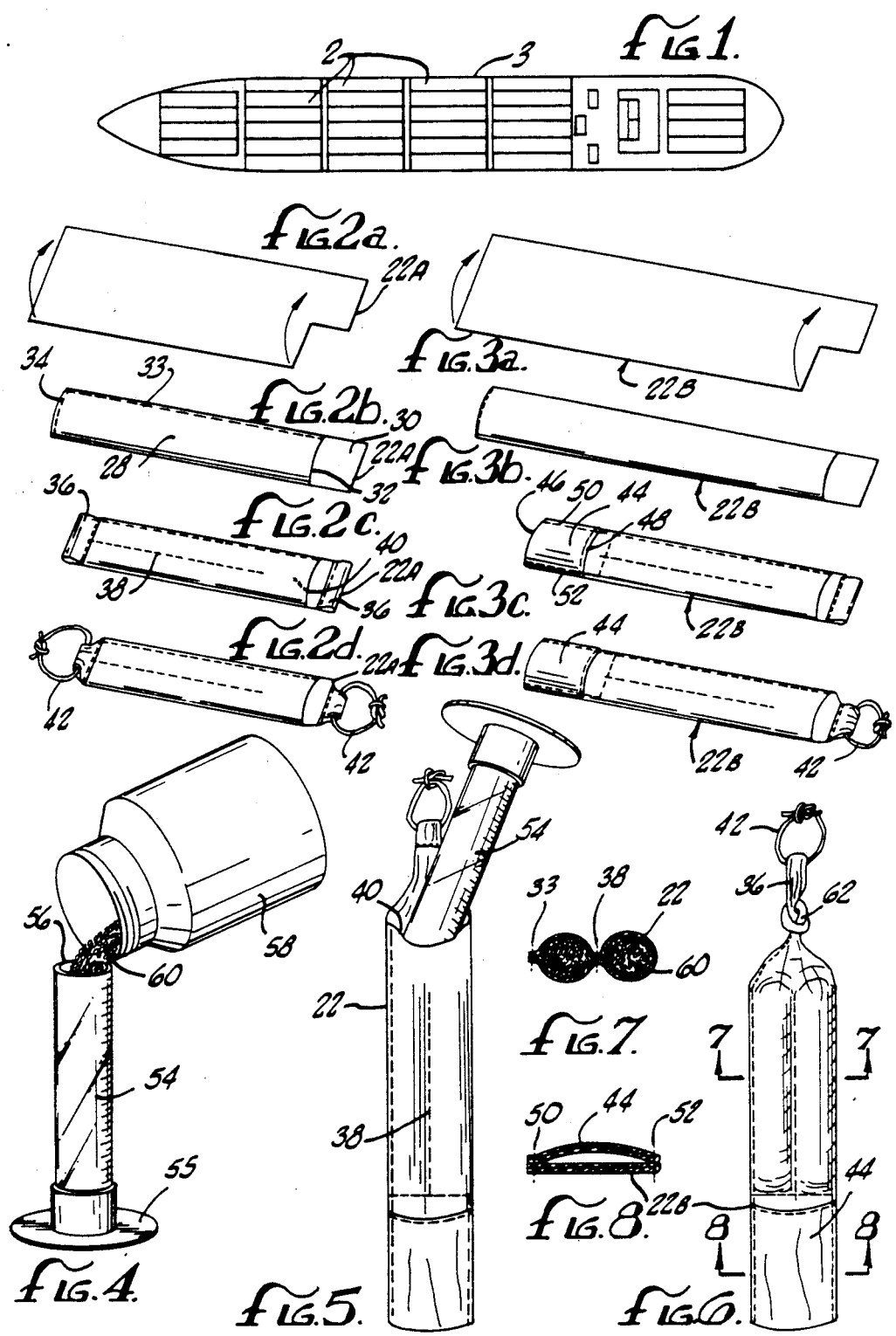

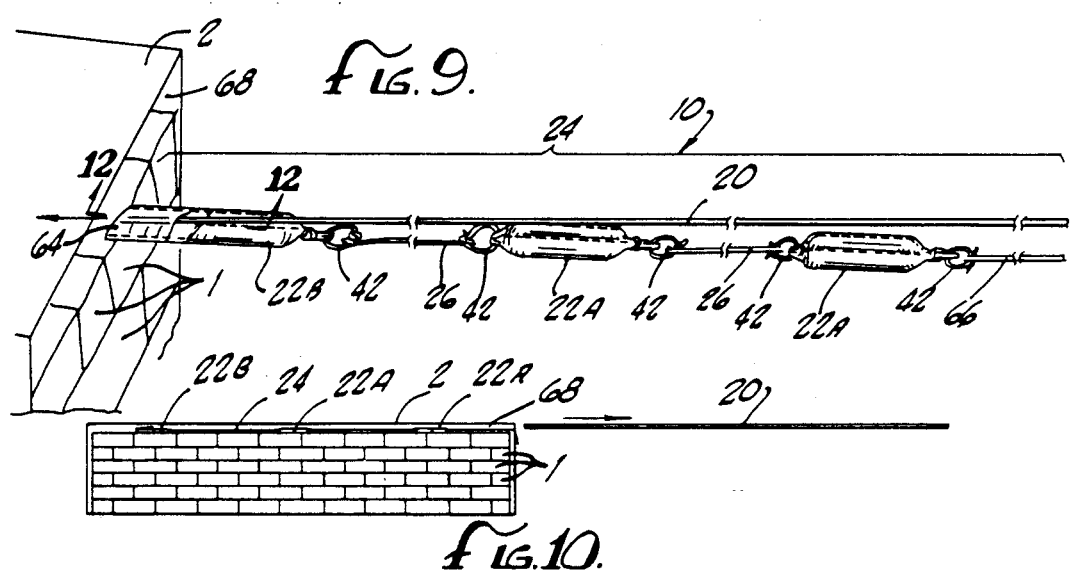
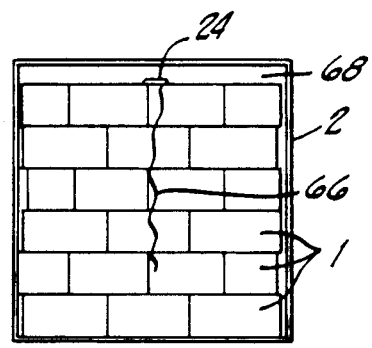
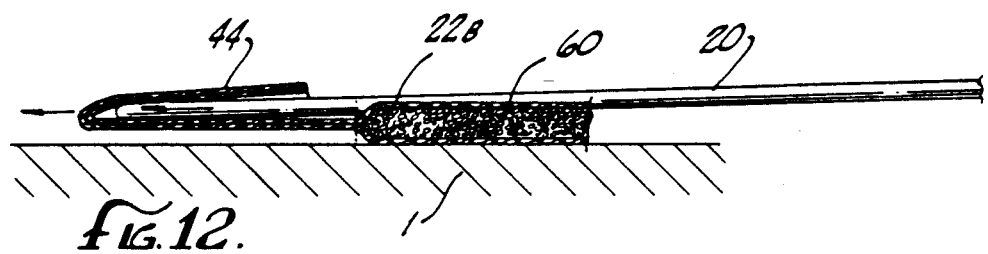
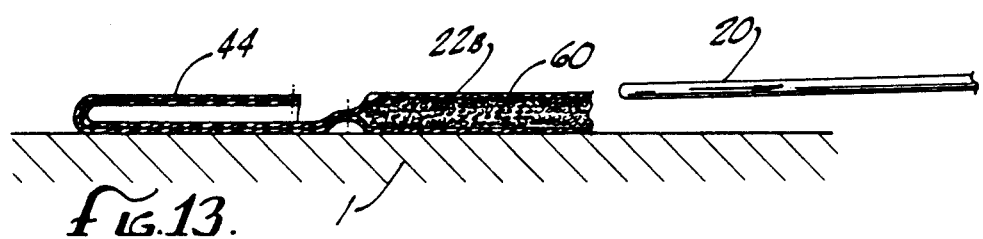

FUMIGATING APPARATUS FOR SHIPPING CONTAINERS

BACKGROUND OF THE INVENTION

1. Field of the Invention

In general, this invention pertains to pest control systems, and in particular, to the fumigation of bulk-packaged commodities held in large shipping containers.

2. Description of the Related Art

The storage and shipment of bulk quantities of certain packaged commodities, such as sacked potatoes, onions, and baled hay, alfalfa and other fodder crops, constitute a significant portion of this nation's interstate and international commerce.

An efficient vehicle for these purposes is the well-known shipping container, which is about 8' wide by 8' high, and either 20' or 40' in length. These containers are often adapted to ride "piggy-back" on a tractor-trailer truck or flatbed rail car and to be stacked compactly by means of a large crane one upon the other in the hold of a seagoing vessel for shipments abroad. The interior volume of the container is typically accessed by means of a hinged door, or pair of doors, at the container's end.

The large quantity of commodities which can be held in such containers, coupled with the extended periods of time often associated with their storage or transportation over long distances, commonly result in the production and proliferation therein of vermin, such as rodents and insects, which feed on or nest in the commodity, which can result in its spoilage or consumption. Accordingly, a problem commonly associated with the bulk storage and shipment of commodities in large shipping containers is that of controlling these pests, which is typically accomplished by fumigation of the commodities with a pesticide while in the container.

A popular type of fumigant that has been in use for many years for this purpose is a metallic phosphide, such as aluminum phosphide (e.g., brands such as FUMITOXIN, PHOSTOXIN, DETIA, and GASTOXIN), which decomposes in the presence of water vapor to form hydrogen phosphide, or phosphine, a toxic gas effective as a pesticide, leaving a generally harmless powdered residue. This fumigant, which is typically provided in solid form, such as tablets or pellets, is described in more detail in U.S. Pat. Nos. 2,826,486, 2,826,527, and 3,132,067.

In the case of grain commodities, such as corn, soybeans, wheat and the like, which are typically shipped in loose bulk, or unpackaged form, fumigation can be achieved by placement of gas-permeable holders containing measured amounts of the fumigant at appropriate locations within the volume of the commodity itself, which placement can be accomplished either before or after the commodity is loaded in the container, such as a silo or the hold of a vessel. A device for placement of an apertured pipe before the grain is loaded, and introduction of the fumigant into the pipe through the upper surface of the grain thereafter, is described in U.S. Pat. No. 4,059,048. A method and apparatus for introduction of gas-permeable sleeves at strategic depths within such bulk-stored grain commodities, either before or after they are loaded, and the introduction into them of the fumigant through the commodity's upper surface after its loading, are disclosed in U.S. Pat. Nos. 4,579,714 and 4,641,573.

These fumigation systems, although effective when used in the context of loose bulk grain commodities held in large containers in which access is available to the upper surface of the grain, have been found to be unsuitable for fumigating bulk-packaged commodities, such as baled hay, which is held in shipping containers of the type described above, for several reasons.

First, the loading of such commodities into the containers usually involves relatively extended periods during which multiple trips are made into the container by loading personnel using, e.g., forklifts or dollies. Placement of the fumigant into the container before loading occurs could thereby result in exposure of these loaders to the fumigating gas.

Second, the packaging of the commodity, whether baled, sacked, boxed or otherwise packaged, and the packing or arrangement of the packages within the container, interfere with the introduction of fumigant holders between the packages after the container is loaded. The only accessible space left within the container for this purpose is usually the narrow, horizontally-extending "headspace" between the top layer of the commodity and the ceiling of the container.

Finally, known systems which involve the introduction of the fumigant into its holders after the commodity is loaded rely upon a vertical placement of the fumigant holders and a gravity feed of the fumigant into them, which in turn, requires a general access to the upper surface of the commodity itself. This access is not available in covered shipping containers, which are loaded and unloaded through the doors at their ends, as described above.

For these reasons, a substantial need exists within the industry for a system for fumigating bulk-packaged commodities held within shipping containers, in a quick, safe, reliable, effective, and inexpensive manner. The present invention fulfills this need and has other advantages as well.

SUMMARY OF THE INVENTION

The apparatus of the present invention includes a long, light weight, relatively rigid pole, and a plurality of inexpensive, gas-permeable, closable fumigant holders which are incorporated into a flexible string and spaced apart therein at predetermined intervals by means of lengths of cord or rope.

In a preferred embodiment, the holders comprise simple, elongated nylon fabric bags or sleeves which are sewn to include an open end defining a throat, a closed end, and loops of fabric at the ends to interconnect the holders into the string.

Means are provided at one end of the string of holders for releasably attaching the string to an end of the pole. A simple and inexpensive preferred means for achieving this is the provision of an external pouch or pocket on the holder at the end of the string which is most distal from the fumigator. The pocket is sized to receive a distal end of the pole in a male-female sliding relationship, such that extension of the pole in the distal direction entrains the string along with the pole, and proximal movement of the pole withdraws the pole end from the pocket and detaches the pole from the string.

The method of using the apparatus of the invention provides a simple, rapid and safe method of fumigating commodities held in large shipping containers.

A graduated flask is used to meter out about equal portions of the required amount of fumigant, which are then poured into the open ends of the holders to charge them. Knots are tied into the holders, or they are otherwise closed against spillage of the fumigant and, if the holders are not already connected into the string, they are incorporated therein at the desired predetermined spacing.

When the string of holders is assembled and charged, the distal end of the pole is inserted into the pocket on the most-distal one of the holders, and a distal portion of the pole, including the distal ends of the string and pole, is inserted through an opening into the container in a generally horizontal direction, and for a predetermined distance, into an open space between the commodity and the container, usually the headspace, such that the string is entirely entrained into the space along with the pole, and generally coextensively with the length of pole inserted. The pole is then detached from the distal end of the string by pulling back on the pole in the proximal direction, and the pole is withdrawn from the space to leave the string emplaced therein.

When the fumigant string is in place, the container is closed and the fumigant is permitted to react with the ambient moisture within the container for the given time required to fumigate the container's contents adequately. After fumigation is complete, the inexpensive string can be disposed of, or if desired, washed and reused.

Other features and advantages of the invention will become appaent from a consideration of the following detailed description of th exemplary preferred embodiments, particularly when taken in conjunction with the accompanying drawings, which are briefly described hereafter and which illustrate, by way of example, the features of the invention.

BRIEF DESCRIPTION OF THE DRAWINGS

FIG. 1 is a schematic, plan view of an ocean-going container ship with a number of large shipping containers of the type discussed herein stacked aboard.

FIGS. 2a-d illustrate, by way of example, the sequential assembly of a fumigant holder in keeping with the present invention;

FIGS. 3a-d illustrate, by way of example, the sequential assembly of another fumigant holder similar to that illustrated in FIGS. 2a-d, but representing a variation thereof which includes an exterior pocket at one end;

FIG. 4 shows a solid fumigant being poured from a container into a graduated flask of the type that is contemplated for use with the present invention.

FIG. 5 illustrates the fumigant holder of FIG. 3d being charged with solid fumigant using the flask shown in FIG. 4.

FIG. 6 shows the fumigant holder of FIG. 5 after filling, in which a knot has been used to close the holder against spillage of its contents;

FIG. 7 is a cross-sectional view of the holder of FIG. 6 taken along the line 7—7 therein and illustrating the holder's compartmentalization;

FIG. 8 is a cross-sectional view into the holder of FIG. 6 taken along the line 8—8 therein and illustrating the pocket at the end of the holder;

FIG. 9 is a side, perspective view illustrating the placement of a string of connected, charged holders into the headspace above the contents (baled hay) of a large shipping container by means of a long insertion pole;

FIG. 10 is a reduced schematic view into the side of the shipping container in FIG. 9 after the string of fumigant holders has been emplaced above the hay and the insertion pole has been removed;

FIG. 11 is a view into the end of the container of FIGS. 9 and 10, with the proximal end of the string of fumigant containers shown in place above the hay;

FIG. 12 is a cross-section through the distal-most holder of the string of fumigant holders illustrated in FIG. 9 taken along the line 12—12 therein, showing the distal end of the insertion pole being captured within the pocket of the holder and the whole assembly being entrained into the headspace above the hay bales in the shipping container; and FIG. 13 is a cross-sectional view similar to that of FIG. 12 immediately after withdrawal of the pole from the pocket of the holder, showing the string of holders in place above the hay for fumigation.

DESCRIPTION OF THE PREFERRED EMBODIMENTS

One of the advantages of the apparatus of the present invention is its simplicity and ease of use in the fumigation of bulk-packaged commodities, such as baled hay 1, held and shipped in large shipping containers 2, which are often stacked aboard large ocean-going vessels 3 for shipment abroad (FIG. 1).

An exemplary preferred embodiment of the apparatus 10 is illustrated in FIG. 9 and includes a long, relatively rigid pole 20 and a plurality of gas-permeable, closeable fumigant holders 22 A and B which are incorporated into a flexible string or chain 24 at intervals of a predetermined spacing by means of lengths of cord or rope 26.

Fabrication of an exemplary fumigant holder 22A, and a variant thereof, 22B, is illustrated sequentially in FIGS. 2a-d and FIGS. 3a-d, respectively.

Referring to FIGS. 2a-d, holder 22A begins as a flat, notched sheet of a strong, inexpensive, gas-permeable fabric, such as nylon or duck cotton. In FIG. 2a, the fabric of the sheet is folded transversly to form a hollow casing or sleeve 28 (See FIG. 2b) having a tab 30 and an open mouth 32 at one end. A stitched seam 33 is sewn along the side and toe of the sleeve to fix the sleeve and define a closed end 34 opposite from the open end 32.

The exemplary preferred holder 22A includes means at both ends for joining it into the connected string 24 and, in the embodiment illustrated in FIG. 2c, these means comprise a pair of simple fabric loops 36 which are formed by doubling the tab 30 at the open end 32, and the closed end 36, back over the sleeve 28 and stitching them transversly across the sleeve to hold them in place, as illustrated.

FIG. 2c also illustrates the use of another, optional longitudinal stitched seam 38 used in the exemplary preferred holder 22A to compartmentalize it. In this case, the seam 38 is extended generally from the closed end 34 longitudinally up the middle of the holder to a point below the open mouth 32 and terminated there to define a loading throat 40.

To complete the means for joining the exemplary holder 22A into the string 24 of similar holders, a pair of simple, inexpensive loops of rope 42 may be fitted through the holder's loops 36 and knotted to close them, as illustrated in FIG. 2d.

FIGS. 3a-d illustrate, by way of example, the sequential fabrication of the variant holder 22B, which is similar in most respects to the holder 22A illustrated in FIGS. 2a–d and differs principally by the absence of the loop 36 at the closed end 34 and the presence there instead of a pocket 44. The pocket 44 has a closed bottom 46, an open top 48 and may be formed by simply doubling the closed end of the holder back upon itself and stitching a pair of longitudional seams 50 and 52 along the sides of the holder (FIG. 3c). The pocket 44, whose purpose is discussed more fully hereinafter, is illustrated in cross-section in FIG. 8.

In the exemplary preferred embodiments illustrated, the holders 22A and 22B are sewn up from sheets of a nylon cloth, which can be selected to contrast in color for ease of identification, are about 3′ long and about 4″ wide after sewing, and are capable of holding about 150–200 grams of aluminum phosphide fumigant each.

The process of loading the holders 22A or 22B with fumigant is the same for either, and is illustrated in FIGS. 4–6. For this purpose, a graduated flask 54 of the type illustrated in FIG. 4 may prove advantageous. The flask 54 is generally cylindrical in shape and may be fabricated from a short length of clear styrene tubing and marked or machined at intervals to indicate graduations by volume. The flask can be fabricated or assembled to include a relatively wide, heavy base 55 to permit it to stand on uneven ground during filling without tipping. It also includes an open top or mouth 56 through which the flask is filled. The procedure is illustrated in FIG. 4 in which a container 58 of pelletized or tablet form of fumigant 60 is opened and the fumigant simply poured into the flask's open mouth to the level desired.

In the exemplary embodiments illustrated in FIGS. 4 and 5, the flask 54 is fabricated from a 1′ length of 2″ diameter clear polystyrene tubing, and is fitted with a clamp-on steel base 55. It is preferrable that the diameter of the flask's mouth be slightly smaller than that of the holder's mouth 32 and throat 40 to facilitate charging of the holder, as discussed hereafter.

When the predetermined amount of the fumigant 60 has been measured out in the flask, the throat 40 cf a holder 22A or 22B is simply slipped over the flask's mouth and the whole affair inverted (see FIG. 5) to permit the fumigant to pour into the holder by gravity. The compartmentalizing seam 38 serves to distribute the fumigant 60 evenly and longitudionally along the length of the holder, thereby preventing the fumigant from bunching or clumping at the bottom of the holder and permitting a larger surface area of the fumigant to contact air through the walls of the holder. This distribution function of the seam 38 is best illustrated in cross-section in FIG. 7.

Once the holder 22 is loaded with the fumigant 60, the mouth of the holder is closed to prevent the fumigant from spilling out. A simple, reliable and effective method of accomplishing this is illustrated in FIG. 6, wherein a knot 62 is tied in the material of the holder above the fumigant and below the open mouth 32 and the connecting loop 36.

Skilled practitioners will recognize that other means of releasably—closing the holders 22 A and 22 B after filling are possible, including the use of inexpensive plastic or metal clips, or a tie-string which can be stitched to the holder in the region adjacent the throat. However, the knot 62 illustrated in the figures has proven to be a simple, inexpensive and effective means for achieving this function.

Once the holders 22 have been charged with their predetermined content of the fumigant 60, they may be incorporated into the flexible, connected string 24 illustrated in FIG. 9 by means of pre-cut lengths 26 of some inexpensive but sturdy material such as cord, nylon rope or light weight chain. As illustrated, the holders are connected to each other at the desired spacing by tying the ends of the ropes 26 through either the loops 36 in the holders themselves or in the short loops of cord or rope 42 already extending through them. Snap fittings can be used, e.g., at the ends of ropes, but these can increase the cost and complexity of the string.

The string 24 of holders is so joined to place a holder 22B of the type which includes the pocket 44 at one end of the string, defined as the distal end 64 because, during insertion of the string into the container using the pole 20, it is the end most distal from the personnel wielding the pole. The balance of the string comprises holders 22A of the type illustrated in FIGS. 2a–d.

The insertion pole 20 of the apparatus can be fabricated from almost any light weight, relatively rigid material, e.g., wood or steel pipe. However, experience has shown that an inexpensive, sturdy and serviceable pole can be fabricated from 1½″–2″ diameter polyvinyl chloride (PVC) pipe typically used in cold water piping systems. For most purposes, a simple, rigid 40′ length of such pipe assembled permanently with suitable connectors will suffice. However, primarily for reasons of portability or lack of access space at the opening of a shipping container, it may be desirable for the pole 20 to be disassemblable into shorter sections, or made to telescope in the manner of a gardener's pruning pole. In this case, appropriate fittings must be provided at the joints of the pole for locking or attaching adjacent sections together to rigidize it.

The method of using the apparatus 10 of the present invention is now described in more detail by way of an example, viz., the fumigation of a standard shipping container 2 (40′ long×8′ wide×8′ high) which is filled with baled hay 1. (See FIGS. 4–11). It has been determined empirically that such a load can be adequately fumigated of all pests by a quantity of about 450 grams of 55% aluminum phosphide (150 tablets or 450 pellets) about evenly distributed in a string of three fumigant holders spaced about 16′ apart, in a holding period or "static" time of about 7 days (168 hours).

Three fumigant holders are selected to include two holders 22A of the type illustrated in FIG. 2d and one holder 22B of the type illustrated in FIG. 3d. Each of the three holders is charged with an about—equal portion (150 grams of 55% aluminum phosphide) of fumigant 60 using the flask 54 or other measuring device as illustrated in FIGS. 4 and 5. The holders are then closed using, e.g., the knot 62 (FIG. 6) and incorporated into the flexible string 24, with the holder 22B occupying the distal end 64 of the string, as illustrated in FIG. 9, by use of two pre-cut, 16′ long lengths of rope 26, as illustrated. It may also be convenient during this step to attach a tail piece 66 of cord or rope to the holder at the other, proximal end of the string, for reasons discussed hereafter.

A distal end of the pole 20 is inserted into the open top 48 of the pocket 44 at the string's distal end 64, as illustrated in FIG. 9, to temporarily attach the pole to the string for their insertion into the container.

The pole 20 is then used as a thrusting member by the fumigator to insert the distal portion of the pole and the string through the open door of the container 2 in a generally horizonal direction, into the headspace 68 above the bales of hay 1 to a depth of about 36 feet into the container at about its center, such that the string of holders is entrained entirely into the headspace within the container and rests on the tops of the bales of hay. During this step, it may be desirable for the fumigator initially to grasp the pole and string together at about their midpoint and to exert a slight restraining force on the string in the direction opposite to that of the direction of insertion in order to cause the string to "track" along the same line traversed by the pole as the pole and string glide along the tops of the bales. At the end of this step, if the string 24 has been provided with a tail piece 66, it is desirable to leave the tail hanging in a region adjacent the doors or opening of the container for later removal of the string after fumigation is complete. The tail piece 66 can also be used to hold a placard containing safety warnings or other information to unloaders.

When the string 24 is in place, the pole 20 is detached from the string by simply withdrawing the pole in the direction indicated by the arrow in FIG. 10, which extracts the end of the pole from the pocket 44, and the pole is then withdrawn entirely from the container. The male-female sliding relationship of the pole 20 within the pocket 44 of the distal-most one of the holders 22B of the string may be seen in enlarged, cross-sectional detail showing insertion of the pole and string in the direction of the arrows in FIG. 12, and extraction of the pole from the pocket to detach the pole and leave the string in place on top of the bales of hay, as illustrated in FIG. 13.

The door or opening of the container 2 is then shut tightly and the solid fumigant in the holders is permitted to react with ambient moisture in the container to generate the fumigating gas therein and produce a powdered, harmless residue within the holders for the required static time, i.e., seven days for this example. At the end of the static period, fumigation is complete, and the load of hay will be both safe for consumption by animals and substantially free of pests for prolonged storage or shipping periods. At the end of this period, the doors of the container 2 are opened to permit the container to air out and the string 24 is removed using the tail piece 66 as a leader. If desired, each of the holders of the string can then be emptied of their powdered residue and washed for reuse. However, because of the low cost of the string in relation to the value of the commodity, the string may be disposed of safely after use, e.g., by burying.

By now, it will be clear that a wide variety of bulk-packaged commodities can be quickly and efficiently fumigated in shipping containers of varying sizes by simple alterations or modifications of the apparatus and steps of the method described hereinabove, depending upon the particular problem at hand. Accordingly, the embodiments illustrated and discussed herein should be taken as exemplary in nature only, and the spirit and scope of the invention limited only by the claims which follow hereafter.

What is claimed is:

1. An apparatus for use in the fumigation of hay or other bulk-packaged commodities held in a large container, using a solid fumigant which, when exposed to ambient moisture, reacts therewith to release a fumigating gas and produce an exhausted, powdered residue, comprising:
   a long pole having proximal and distal ends;
   an elongated, gas-permeable, solid-impermeable holder for holding said fumigant in a gas-exchanging relationship with ambient air, said holder having a closed end, an open end defining a throat, means at said open end for closing it, and means at at least one of said ends for joining said holder into a flexible string of similar holders at spaced intervals in said string; and
   means for releasably attaching said holder to the distal end of said pole for insertion of the holder into the container.

2. The apparatus of claim 1, wherein said holder further comprises a flexible fabric sleeve.

3. The apparatus of claim 2, wherein said sleeve is made of a synthetic fabric.

4. The apparatus of claim 2, wherein said sleeve is longitudinally compartmentalized for distributing said fumigant evenly within said sleeve along the length thereof.

5. The apparatus of claim 4, wherein said sleeve is longitudinally compartmentalized by means of a stitched seam extending longitudinally from said closed end to just below said throat.

6. The apparatus of claim 2, wherein said sleeve holds said fumigant and comprises a knot at said open end.

7. The apparatus of claim 2, wherein said means for joining said holder into said flexible string further comprise a closed loop formed in said sleeved by doubling an end of said sleeve back upon itself and attaching it to said sleeve.

8. The apparatus of claim 2, further comprising: a pocket disposed longitudinally on said sleeve, said pocket having a closed end, an open end, and being sized to receive an end of said pole in a male-female sliding relationship.

9. An apparatus for use in the fumigation of hay or other bulk-packaged commodities held in a large container, using a solid fumigant which, when exposed to ambient moisture, reacts therewith to release a fumigating gas and produce an exhausted, powdered residue, comprising:
   an elongated, rigid member;
   a plurality of distinct, gas-permeable, solid-impermeable, closable holders for said fumigant, each said holder having means for receiving and holding a predetermined charge of said fumigant in gas-exchanging relationship with the interior of said container;
   means for incorporating said holders into a flexible string at predetermined intervals, said string having proximal and distal ends and a length about the same as said member; and
   means for releasably attaching said distal end of said string to a distal end of said member such that extension of a distal portion of said member in a generally horizontal direction into an open space between said commodity and said container draws said string into said space generally parallel and coextensively with said distal portion, and such that detachment of said member from said string and withdrawal of said member from said space leaves said string emplaced therein.

10. The apparatus of claim 9, wherein each said fumigant holder further comprises an elongated, fabric sleeve having a closed end, an open end and means for releasably closing said open end.

11. The apparatus of claim 10, wherein said sleeve is made of a synthetic fabric.

12. The apparatus of claim 10, wherein said sleeve is longitudinally compartmentalized for distributing said fumigant evenly within said sleeve along the length thereof.

13. The apparatus of claim 10, wherein said sleeve holds said fumigant and comprises a knot at said open end.

14. The apparatus of claim 10, wherein said means for incorporating said holders into said string further comprise a loop formed in said sleeve by doubling an end of said sleeve back upon itself and sewing it to said sleeve.

15. The apparatus of claim 9, wherein said means for releasably attaching said distal end of said string to said member's distal end further comprise:
   a pouch disposed on a distal-most one of said holders, said pouch having a closed end disposed toward said string's distal end and an opening disposed toward said string's proximal end, and being sized to receive said member's distal end in a male-female sliding relationship.

16. An apparatus for fumigating hay or other bulk-stored commodities held in large containers having a predetermined span using a solid fumigant which, when exposed to ambient moisture, reacts therewith to release a fumigating gas and produce an exhausted powdered residue, comprising:
   a pole having proximal and distal ends and a length;
   a string of connected, gas-permeable, solid-impermeable, closable holders for said fumigant,
   said string having proximal and distal ends, a length about commensurate with said pole, and means for flexibly connecting adjacent ones of said holders to each other within said string,
   each said holder having means for receiving and holding a predetermined charge of said fumigant in gas-exchanging relationship with the interior of said container and for discharging said charge when exhausted; and
   means for releasably attaching said distal end of said string to said pole's distal end such that insertion of a distal portion of said pole into said container in a generally horizontal direction entrains said string thereinto in a direction generally parallel and in an amount co-extensive with said distal portion, and such that withdrawal of said portion leaves said string in place.

17. The apparatus of claim 16, wherein each said solid-fumigant holder further comprises an elongated, gas-permeable sleeve having a closed end, an open end and means for releasably closing said open end.

18. The apparatus of claim 17, wherein said gas-permeable sleeve is made of a fabric.

19. The apparatus of claim 18, wherein said sleeve is made of a nylon fabric.

20. The apparatus of claim 17, wherein said sleeve is longitudinally compartmentalized for distributing said fumigant evenly within said sleeve along the length thereof.

21. The apparatus of claim 20, wherein said sleeve is compartmentalized by means of a longitudinal, stitched seam.

22. The apparatus of claim 16, wherein said means for flexibly connecting adjacent ones of said holders to each other further comprise lengths of cord, or chain.

23. The apparatus of claim 16, wherein said means for releasably attaching said distal end of said string to said pole's distal end further comprise:
   a pouch disposed on a distal-most one of said holders, said pouch having a closed end disposed toward said string's distal end and an opening disposed toward said string's proximal end, and being sized to receive said pole's distal end in a male-female sliding relationship.

24. The apparatus of claim 16, wherein said pole is segmented, and further comprises means for rigidly assembling adjacent ones of said segments together at adjacent ends thereof.

25. The apparatus of claim 16, wherein said pole is telescopically segmented, and further comprises means for rigidly locking concentric ones of said segments together.

* * * * *